UNITED STATES PATENT OFFICE.

ANTONIO PELLETIER, OF WASHINGTON CITY, DISTRICT OF COLUMBIA.

IMPROVED COMPOSITION FOR MANUFACTURING STONE, AND FOR OTHER PURPOSES.

Specification forming part of Letters Patent No. 74,587, dated February 18, 1868.

*To all whom it may concern:*

Be it known that I, ANTONIO PELLETIER, of Washington, in the District of Columbia, have invented certain new and useful Improvements in Composition for Coating Wood, Cloth, Leather, Stone, Glass, &c.; and I do hereby declare that the following is a full, clear, and exact description of the same.

To enable others skilled in the art to construct and use my invention, I will proceed to describe it.

My invention relates to improvements in the composition of matter for which Letters Patent were granted me, No. 63,087, dated March 19, 1867, and No. 71,210, dated November 19, 1867.

While the compositions for which my patents were obtained answer well for the purposes for which they were designed, I have found, by further experiments, that they may be materially improved.

My composition, as now made, used, and treated with my latest improvements, I find makes a perfectly fire-proof and water-proof coating for wood and other perishable materials, and is particularly suited for covering roofs, floors, sidewalks, decks of ships, walls, tables, &c., or for preparing artificial stone.

In making my composition, I take fifty pounds of vegetable fibrous matter, or instead of it, mineral asbestus, or powdered emery, (or use these ingredients all mixed together,) fifty pounds of soap-stone, (or other talcose silicates,) three gallons of liquid silicate of soda, of specific gravity 1.2 to 1.4, six pounds of litharge, and thoroughly mix and incorporate them together, till the whole mass becomes soft and plastic, by means of mechanical devices described in my former patents. The plastic composition thus made I apply, with proper instruments, to any kind of surface, be it wood, paper, pasteboard, cloth, leather, brick, stone, or metal, and then suffer it to dry and harden.

When I desire to make the coating not only fire-proof, but also impervious to water and other fluids, I apply to it, lastly, an aqueous solution of chloride of zinc, (or other salts of zinc,) containing about ten per cent. of dry salt, repeating the operation, if necessary. Solutions of sal ammoniac, chloride and sulphate of iron, chloride or other salts of lead, oxide of zinc, or other metallic oxides or salts may be employed instead. The chloride of zinc, or its equivalents, are not used until the coating has become nearly dry, which takes place after the lapse of about two hours.

The same composition is equally valuable as a coating for houses, light-houses, ships, wharves—protecting them against the corroding action of water, especially by the addition or use of varnish or drying-oils. The mass is unsurpassed as a lining of safes, boxes, barrels, for coating the bottoms of ships, or for manufacturing artificial stone. In preparing stone, however, I employ, in addition to the ingredients already described, sand, or other silicious cheap material, such as iron, slag, alumina, rubble, or broken stone of any description, &c.

Having thus described my invention, what I claim is—

1. The compound, consisting of vegetable fiber, mineral asbestus, emery-powder, soap-stone, silicate of soda, or potassa, and litharge, substantially as described and set forth.

2. The compound, consisting of vegetable fiber, mineral asbestus, emery, soap-stone, silicate of soda, or potash, litharge, when manufactured into stone, (sand being used in addition,) or when coated on wood, cloth, leather, brick, stone, metals, or other solid surfaces, and treated with chloride of zinc, oxide of zinc, sal ammoniac, chloride and sulphate of iron, salts of lead and manganese, sulphite of lime, substantially as described, and for the purpose set forth.

3. I claim, as a new article of manufacture, the composition, substantially as herein described, and for the uses and purposes set forth.

ANTONIO PELLETIER.

Witnesses:
H. B. MUNN,
R. A. DOUGLAS.